United States Patent [19]

Curtiss, Jr.

[11] 4,253,511

[45] Mar. 3, 1981

[54] TIRE WITH SUPPORTABLE SIDEWALLS

[75] Inventor: Walter W. Curtiss, Jr., Akron, Ohio

[73] Assignee: The Goodyear Tire & Rubber Company, Akron, Ohio

[21] Appl. No.: 64,288

[22] Filed: Aug. 6, 1979

[51] Int. Cl.³ .................... B60C 17/00; B60C 13/00
[52] U.S. Cl. ................ 152/330 RF; 152/352 A; 152/353 R; 152/379.3
[58] Field of Search ............ 152/152, 330 RF, 352 R, 152/352 A, 353 R, 353 GG, 370.3

[56] References Cited

U.S. PATENT DOCUMENTS

| | | | |
|---|---|---|---|
| 1,969,088 | 8/1934 | Maranville | 301/6 A |
| 2,146,942 | 2/1939 | Czerwin | 152/153 |
| 2,874,745 | 2/1959 | Wann | 301/37 ST |
| 3,117,614 | 1/1964 | Amici | 152/379.1 |
| 3,247,880 | 4/1966 | Bateri | 152/209 |
| 3,782,440 | 1/1974 | Depmeyer | 152/353 R |
| 3,805,868 | 4/1974 | Tagorra | 152/361 R |
| 3,850,218 | 11/1974 | Bertelli et al. | 152/361 R |
| 3,861,438 | 1/1975 | Bertelli et al. | 152/355 |
| 3,954,131 | 5/1976 | Hoshino et al. | 152/353 R |
| 3,961,657 | 6/1976 | Chrobak | 152/355 |
| 3,983,918 | 10/1976 | French | 152/353 R |
| 4,004,628 | 1/1977 | Tangorra et al. | 152/353 C |
| 4,029,139 | 6/1977 | Abbott | 152/379.1 |
| 4,059,138 | 11/1977 | Mirtain et al. | 152/352 A |
| 4,077,455 | 3/1978 | Curtiss, Jr. et al. | 301/97 |
| 4,096,900 | 6/1978 | Olsen | 152/354 R |
| 4,124,052 | 11/1978 | Beauchamp | 152/352 R |
| 4,142,567 | 3/1979 | Johannsen et al. | 152/354 R |
| 4,168,732 | 9/1979 | Monzini | 152/379.2 D |
| 4,170,254 | 10/1979 | Jackson | 152/361 R X |
| 4,203,481 | 5/1980 | Ranik, Jr. | 152/330 RF |

FOREIGN PATENT DOCUMENTS

| | | |
|---|---|---|
| 2645858 | 4/1978 | Fed. Rep. of Germany . |
| 2195535 | 3/1974 | France . |
| 3-138106 | 12/1928 | Japan . |
| 13727 | 4/1925 | Netherlands . |

OTHER PUBLICATIONS

"Lug Tire", *Popular Science* Magazine, May 1979, p. 95.

*Primary Examiner*—John T. Goolkasian
*Assistant Examiner*—Lois E. Boland
*Attorney, Agent, or Firm*—J. C. Simmons

[57] ABSTRACT

A tire and a tire and rim assembly. The rim comprises a pair of annular support members extending axially outwardly of a pair of bead seat surfaces. The axial width of a tread of the tire is greater than the axial distance between the annular support members. A plurality of sidewall appendages are connected on the exterior surfaces of the sidewalls of the tire such that they are spaced apart from the annular support members when the tire is inflated and in supporting contact with the annular support members when the tire is uninflated and under load. The sidewall appendages extend radially and axially along the sidewalls such distances that when the tire is uninflated and under normal load, the support members support the sidewall appendages to maintain the shape of the sidewalls substantially the same as when the tire is under normal inflation pressure and load.

25 Claims, 5 Drawing Figures

TIRE WITH SUPPORTABLE SIDEWALLS

This invention relates to tires and to tire and rim assemblies. In particular, this invention relates to a pneumatic tire for use in conjunction with a rim such that when the tire is uninflated and under normal load, the shape of its sidewalls is generally the same as their shape under normal inflation pressure and load.

Many suggestions have been made for the development of the so-called runflat tire; i.e. a tire which is capable of being used for a minimum distance at a minimum speed without damage after becoming uninflated. A major problem encountered in this area is the destructive heat build-up from the friction which results when the sidewalls and tread of a tire rub against each other during operation of a tire in the uninflated condition. When a tire is punctured and becomes uninflated, the lower and upper sidewalls and tread all have to rotate at the same angular velocity. When a section of the uninflated tire is travelling through its footprint; that is, engaging the surface upon which it is travelling, the tread and lower sidewalls collapse toward the rim. Since the overall circumferential length of these portions of the tire has not changed, these portions of the tire must necessarily traverse the footprint at a greater linear velocity. Relative movement between these various portions of the tire must therefore occur during rotation of the rim and severe abrasion results. As each section of the tire travels through the footprint, this problem would be substantially lessened if the sidewalls were supported so that their shape was substantially maintained during operation of the tire while uninflated.

Attempts to solve this problem are included among efforts to develop a reliable and easily constructed runflat compression sidewall tire.

If conventional pneumatic tires did not have reinforcing cords such as a ply reinforcement structure extending around the carcass from bead to bead, they would have a tendency to expand outward without constraint.

The compression sidewall tire eliminates the requirement of having reinforcing cords in the sidewall and bead regions. In this tire, each sidewall is constructed such that its exterior side, as viewed in cross-section taken in a radial plane, is concave. A radial plane, as used in this specification, is a plane which includes the axis of rotation of a tire.

For the compression sidewall tire to operate, it is required that the sidewalls be constrained between the rim at one end and a reinforcement structure such as a tread belt at the other end. When the tire cavity is inflated to normal inflation pressure, the interior forces of air pressure against the sidewalls have the tendency to force the sidewalls through the space defined by the two previously described points of constraint. The sidewalls must be of sufficient bending stiffness, curvature, and thickness, in accordance with good design practice, to resist this resultant compressive stress to such an extent that the sidewalls are constrained and thus prevented from indefinite expansion outwardly.

Of course, such compression sidewall tires encounter the same destructive heat buildup problem as conventional tires encounter when uninflated.

A tire according to the present invention provides a solution to this problem for certain conventional tires as well as those of the compression sidewall type by providing appendages on the sidewalls thereof, which are engaged by support members on the rim to maintain the sidewalls when the tire is uninflated and under normal load in substantially the same shape as the shape of the sidewalls when the tire is under normal inflation pressure and load, yet the support members do not interfere with the operation of the tire or the sidewall appendages when the tire is under normal inflation pressure and load.

A tire according to the present invention is of the pneumatic type. Its cross-section in a radial plane may be characterized generally as triangular or pyramid-shaped, the axial width of the tread being greater than the axial distance between the rim flanges. As used in this specification, "axial" refers to a direction parallel to the axis of rotation of a tire from the mid-circumferential plane.

A tire according to this invention is used with a rim which includes an annular support member connected to each flange of the rim and extending axially outwardly of each bead seat surface of the rim.

The tire includes a plurality of sidewall appendages such as columns of elastomeric material connected on the exterior surfaces of each of the sidewalls such that they are spaced apart from the annular support members when the tire is under normal inflation pressure and load, and the annular support members operatively engage the appendages for support of the sidewalls when the tire is uninflated and under load, as the tire travels through the footprint.

The inclination of the sidewalls is such that each sidewall, in a cross-section taken in a radial plane, is disposed to lie axially inwardly of a straight line connecting the respective shoulder and bead portion. The correlation of tread axial width, sidewall inclination, mass and strength of the sidewall appendages, and extension of the sidewall appendages radially and axially along the sidewalls is such as to permit the sidewall appendages, when the tire is uninflated and under normal load, to maintain the shape of the sidewalls in substantially the same shape as the shape of the sidewalls under normal inflation pressure and load. The term "radially" as used in this specification, refers to a direction in a radial plane from the axis of rotation of a tire.

Because the sidewalls of the tire of this invention are maintained, while uninflated and under load, in generally the same shape as their shape under normal inflation pressure and load, very little relative movement between various portions of the tire is expected to occur as the tire travels through the footprint while uninflated. Thus, very little abrasion should occur resulting in a tire which is expected to have excellent runflat capabilities.

The sidewall appendages should be very suitable for application on the sidewalls of compression sidewall tires to provide the same excellent runflat capabilities.

The invention, accordingly, consists in the features of construction, combination of elements, and arrangement of parts which will be exemplified in the construction hereinafter set forth and the scope of the application of which will be indicated in the appended claims.

Figure 1:
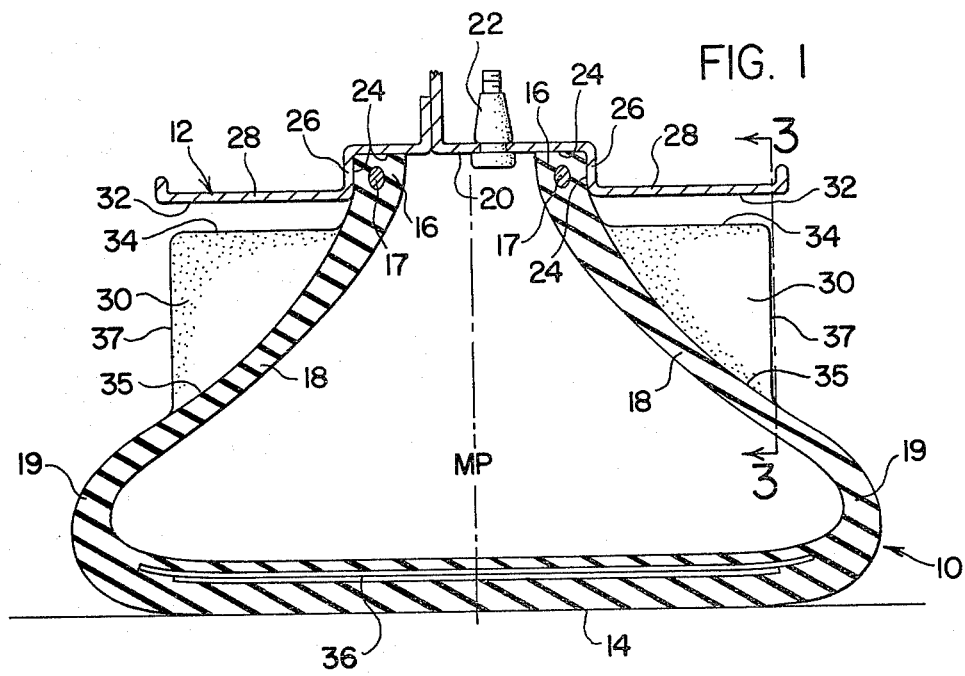
FIG. 1 is a partial cross-sectional view taken in a radial plane of a tire and rim in accordance with this invention with the tire under normal inflation pressure and load.
Figure 2:
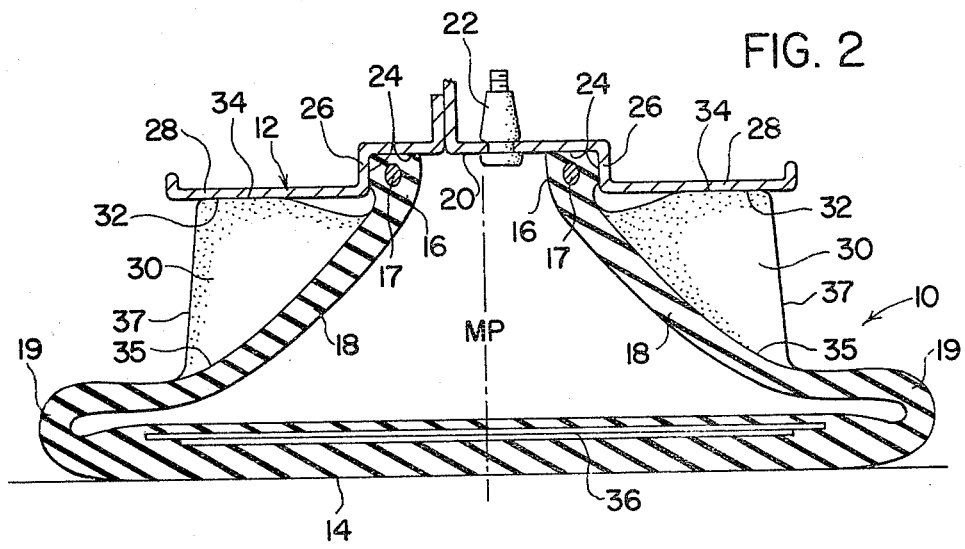
FIG. 2 is a view similar to that of FIG. 1 with the tire uninflated and under normal load.

As best shown in FIGS. 1 and 2, this invention pertains to a pneumatic tire 10 for use with a rim 12 such that when the tire 10 is uninflated and under normal load, as shown in FIG. 2, the shape of the sidewalls 18 thereof is maintained in substantially the same shape as their shape under normal inflation pressure and load, as shown in FIG. 1. Normal inflation pressures and loads are those for which a tire is designed for normal operation. Unless otherwise specified, the tire 10 and rim 12 are preferably symmetrical with respect to the mid-circumferential plane MP of the tire 10.

The tire 10 is preferably made of an elastomeric material such as rubber containing reinforcements as hereinafter described and comprises a circumferentially extending ground-engaging tread 14, a pair of bead portions 16 for mounting of the tire 10 on the rim 12, and a pair of inclined sidewalls 18 integrally and operatively disposed between the tread 14 at the axially outer portions thereof and bead portions 16. A pair of shoulders 19 are integrally formed at the junctions of the tread 14 and sidewalls 18.

The rim 12 comprises an annular central portion 20 which may be a single piece or which may result from two sections joined together as shown, an air pressurizing valve 22, rim flanges 26 connected to the annular central portion 20 axially outwardly thereof, and means for retaining the tire on the rim such as a pair of annular bead seat surfaces 24 on the central portion 20 and rim flanges 26 axially spaced outwardly thereof to operatively engage the bead portions 16.

An annular support member 28 is preferably integrally connected to each of the annular rim flanges 26 and extends axially outwardly of each of the bead seat surfaces 24. The annular support member 28 is connected preferably to the radially outer portion of each respective annular rim flange 26. The tread 14 has an axial width greater than the axial distance between the annular support members 28.

A plurality of sidewall appendages such as columns 30 of elastomeric material are operatively and integrally formed on the exterior surface of each sidewall 18 such that they are spaced apart from the annular support members 28 when the tire 10 is under normal inflation pressure and unloaded, as well as when under load, as shown in FIG. 1, and the annular support members 28 operatively engage appendages for support of the sidewalls 18, as shown in FIG. 2, when the tire 10 is uninflated and under load. The appendages should be spaced apart at least such a distance that they will not engage the support members 28 during normal use of the tire 10 under normal inflation pressure and load.

The columns 30 extend radially along the sidewalls 18 such a distance that when the annular support members 28 engage the columns 30 upon deflection of the tire 10 as it travels through the footprint while uninflated, the columns 30 support the sidewalls 18 to maintain them in generally the same shape as under normal inflation pressure and load. In order to achieve this, each column 30 should extend in a radial plane along the respective sidewall 18 a distance equal to at least half of the distance in the radial plane along the exterior side 35 of the sidewall 18 from the axially outermost point of the respective shoulder 19 to the point of intersection of the exterior side 35 of the respective sidewall 18 with a line extending axially inwardly of the tire 10 from the radially outer surface 32 of the annular support member 28 when the tire 10 is mounted on the rim 12 and placed under normal inflation pressure and unloaded.

The purpose of the radially outer surface 32 of each annular support member 28 is to engage the columns 30. Each column 30 has a radially inner surface 34 for engagement by the respective annular support member 28 and a generally radially extending axially outer surface 37.

The sidewalls 18 must be of such inclination that when the tire 10 is uninflated and under normal load, the columns 30 can support the sidewalls 18 in generally the same shape as the shape thereof under normal inflation pressure and load. The inclination of the sidewalls 18 is such that each sidewall 18, in a cross-section taken in a radial plane, is disposed to lie axially inwardly of a line connecting the respective shoulder 19 and the respective bead portion 16. With such an inclination of the sidewalls 18, as well as such tread width as previously described, the columns 30 will extend along the sidewalls 18 a distance axially within the confines of the axial width of the tread 14 so as to provide sufficient axial width to the radially inner surface 34 of each column 30 for engagement by the annular support members 28 to support the sidewalls 18.

The greater the axial width of the tread 14, the greater is the axial distance which the columns 30 may extend outwardly from the sidewalls 18. As this distance is increased, the strength of the columns 30 for supporting the sidewalls 18 is increased. It is expected that if the axial width of the tread 14 is less than 25 percent greater than the axial distance between the annular rim flanges 26, the axial distance which the columns 30 may extend along the sidewalls 18 will not be sufficient for support of the sidewalls 18. The preferred axial width of said tread 14 is two to three times the axial distance between the annular support members 28.

As the axial width of the tread 14 increases thus increasing the axial distance which the columns 30 may extend along the sidewalls 18 and increasing the strength which each column 30 may have for supporting the sidewalls 18, the spacing between adjacent columns 30 may increase. It is expected that this spacing should vary between 16 percent and 180 percent of the column width. Of course, this spacing is also dependent on other considerations such as the thickness of the sidewalls 18 and the thickness and modulus of compression of the columns 30.

Thus, several factors are involved in constructing the tire 10 to provide satisfactory performance while inflated and while uninflated. These factors include the axial width of the tread 14 in relation to the axial distance between the annular support members 28, the mass and strength of the columns 30, the inclination of the sidewalls 18 and the distance radially and axially which the columns 30 extend along the sidewalls 18. These factors are interrelated to each other and one skilled in the art should be able to correlate these factors to each other to design and produce a satisfactory tire in accordance with the invention.

The sidewalls 18 are preferably slightly curved so as to promote a slight bending of the sidewalls 18 inwardly upon deflection for optimum performance of the tire 10 while uninflated and to prevent outward bulging which occurs in conventional tires.

The tire 10 may have a conventional reinforcing ply structure running between the bead portions 16. On the other hand, as shown in the drawings, the tire 10 may be of the compression sidewall type not having a reinforcing ply structure. The tire 10 may also have inextensible beads 17 in the bead portions 16.

As used in this specification, the term "compression sidewall" refers to a tire such as is shown in FIG. 1 wherein the exterior sides 35 of the sidewalls 18, when viewed in a cross-section taken in a radial plane as therein shown, are concave. The sidewalls 18 have a correlation of bending stiffness, curvature, and thickness, and the shoulders 19 have sufficient stiffness such as by means of the breaker structure described hereinafter to constrain the sidewalls 18 between the rim 12 and respective shoulders 19 against indefinite expansion outwardly and against movement between the rim 12 and respective shoulders 19 and resulting change of shape of the exterior sides 35 from concave to convex.

In the preferred embodiment of this invention, a conventional annular belt or breaker reinforcement structure 36 is embedded within the elastomeric material of the tire 10 radially inwardly of the grooves forming the pattern of the tread 14 and extending substantially across the entire axial width of the tread 14 and into the shoulders 19 for reinforcement of the tread 14 and to provide points of constraint in the shoulder regions 19 for holding the sidewalls 18 in compression. This reinforcement 36 can be of any configuration or comprised of any material or any number of belts or breakers which proper design considerations will allow.

An appendage containment means, such as an annular containment flange 38 may be operatively disposed and integrally attached generally axially outwardly of each annular support member 28 for holding the sidewall shape by restraining the appendages from substantial axially outward movement during operation of the tire 10 while uninflated. The axially outer surface 37 of an appendage, such as column 30 is disposed axially inwardly of the annular containment flange 38. The annular containment flange 38 extends radially outwardly beyond the radially inner surface 34 of the columns 30 during operation.

Means for retaining the tire on the rim include means for preventing the tire from becoming dislodged from the rim during operation while uninflated. Such means may be provided by configuring the rim 12 to engage the axially inner portions of the bead portions 16 or by decreasing the distance axially between the bead seat surfaces 24 so that the bead portions 16 will act as means for preventing such dislodgment. The annular support member 28 and columns 30 and the annular central portion 20 of the rim 12, if constructed without a drop center as shown in FIGS. 1 and 2, also act as means for preventing the tire from becoming dislodged from the rim during operation while uninflated.

The plurality of columns 30 extend circumferentially around each sidewall 18 and are preferably spaced apart. They may be molded or adhered to the sidewalls 18 or attached in any other conventional manner adequate to perform as described herein. The columns 30 comprise an elastomeric material such as rubber having sufficient strength under compression and extension to perform as herein described. The modulus of compression of the column 30 is expected to be between 25 and 150 pounds per square inch at 15 percent compression. The modulus of elasticity is expected to be between 75 and 725 pounds per square inch at 15 percent elongation.

Figure 3:
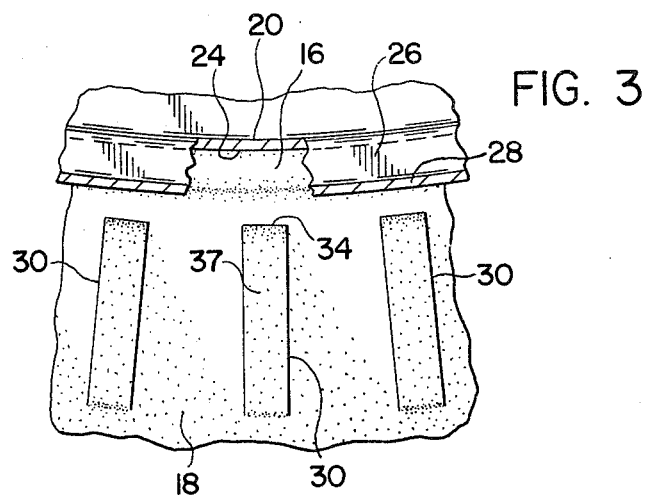
FIG. 3 is a partial view with parts cut away taken along line 3—3 of FIG. 1.

The sidewall columns 30 can be of any desired shape and reinforced with any desired reinforcing materials consistent with good engineering design, the preferred embodiment being the columns 30 shown in FIG. 3. In that embodiment, their cross-sectional shape taken in a radial plane of the tire 10, as shown in FIG. 1, is generally right-triangular with the hypotenuse lying along the sidewalls 18, and the cross-sectional shape taken in a plane perpendicular to the axis of rotation of the tire 10, as shown in FIG. 3, is rectangular. It should, of course, be understood that the hypotenuse referred to above is not exactly a straight line but follows the contour of the sidewalls 18.

Figure 4:
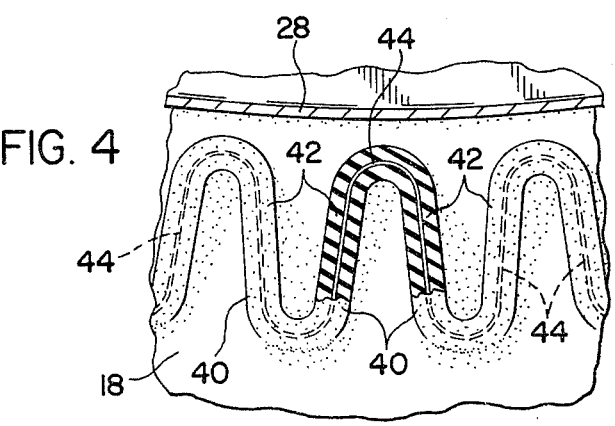
FIG. 4 is a view similar to that of FIG. 3 showing an alternative embodiment of the sidewall appendages.
Figure 5:
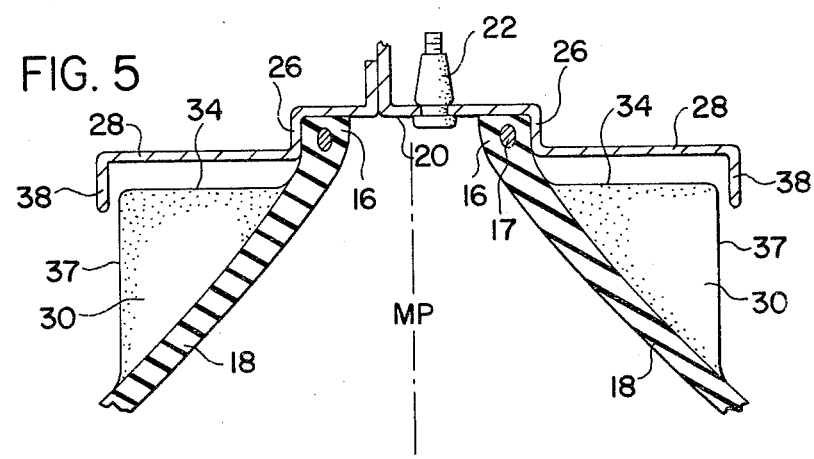
FIG. 5 is a partial cross-sectional view taken in a radial plane of the tire and rim shown in FIG. 1 showing an alternative embodiment of the rim.

In an alternative embodiment of the sidewall appendages as shown in FIG. 4, their cross-sectional shape, taken in a plane perpendicular to the axis of rotation of the tire 10, is generally sinusoidal so as to form support bodies 40 continuously joined over the annular periphery of the sidewall 18. Each support body 40 comprises a pair of legs 42, each of which gradually and integrally merge into the respective sidewall 18 and the adjacent leg 42 of the adjacent respective support body 40. These support bodies 40 may be reinforced with fabric 44 in the geometric configuration of ribbon as shown.

While certain representative embodiments and details have been shown for the purpose of illustrating the invention, it will be apparent to those skilled in the art that various changes and modifications may be made therein without departing from the spirit or scope of the invention.

What is claimed is:

1. A tire for use with a rim having an annular central portion, means including a pair of rim flanges for retaining the tire on the rim, and a pair of annular support members extending axially outwardly of the means for retaining the tire on the rim, the tire comprising a ground-engaging tread having a width axially of the tire which is greater than the distance axially of the tire between the rim flanges, a pair of bead portions for engagement with the means for retaining the tire on the rim, a pair of shoulders connected to the tread axially outwardly thereof, a pair of sidewalls, the length of said sidewalls extending between the shoulders and the bead portions, and sidewall appendages positioned on the sidewalls and extending in axial and radial directions such distances that said sidewall appendages supportively engage the support members to maintain the sidewalls in substantially the same shape generally over their length when the tire is uninflated and under normal load as the shape of the sidewalls when the tire is under normal inflation pressure and load, said sidewall appendages being positioned on the sidewalls so as to be spaced from the support members when the tire is under normal load and inflation pressure.

2. The tire according to claim 1, wherein each shoulder has sufficient strength to constrain the respective sidewall between the respective shoulder and the rim, each sidewall having appropriate bending stiffness, curvature, and thickness so as to constrain it between the respective shoulder and the rim.

3. The tire according to claim 1, further comprising an annular reinforcement structure extending axially across the tread into the shoulders and having sufficient strength to constrain each sidewall between the respective shoulder and the rim, each sidewall having appropriate bending stiffness, curvature, and thickness so as to constrain it between the respective shoulder and the rim.

4. The tire according to any one of claims 2 or 3, wherein each sidewall has an exterior side which is concave when viewed in a cross-section taken in a plane which includes the axis of rotation of the tire.

5. The tire according to claim 1, wherein the means for retaining the tire on the rim further includes a pair of annular bead seat surfaces on the annular central portion.

6. The tire according to claim 1, wherein said sidewall appendages comprise columns of elastomeric material spaced apart circumferentially about the tire and having sufficient strength under compression to maintain the sidewall shape.

7. The tire according to claim 1, wherein said sidewall appendages comprise support bodies continuously joined over the annular periphery of the sidewalls and having sufficient strength under compression to maintain the sidewall shape, each said support body having a pair of legs, each of which merges into the respective sidewall and the adjacent leg of the adjacent support body.

8. The tire according to any one of claims 6 or 7, wherein the modulus of compression of said sidewall appendages is at least 25 pounds per square inch at 15 percent compression.

9. The tire according to any one of claims 1, 2, or 3, wherein each annular support member includes a radially outer axially extending surface for engaging said respective sidewall appendages, each said sidewall appendage extending in a plane which includes the axis of rotation of the tire a distance along the respective sidewall which is at least equal to half of the distance in the plane along the exterior side of the sidewall from the axially outermost point of the respective shoulder to the point of intersection of the exterior surface of the respective sidewall with a line extending axially inwardly of the tire from the radially outer surface of the respective annular support member when the tire is mounted on the rim and placed under normal inflation pressure and unloaded.

10. In a tire and rim, an annular central portion and a pair of rim flanges on the rim, a pair of annular bead seat surfaces on the annular central portion, and an annular support member extending axially outwardly of each bead seat surface, a pair of bead portions on the tire for engagement with the bead seat surfaces for mounting of the tire on the rim, a ground-engaging tread having a width axially of the tire which is greater than the distance axially of the tire between said rim flanges, a pair of shoulders connected to the tread axially outwardly thereof, a pair of sidewalls, the length of said sidewalls extending between the shoulders and the bead portions, and sidewall appendages positioned on the sidewalls and extending in axial and radial directions such distances that said sidewall appendages supportively engage the support members to maintain the sidewalls in substantially the same shape generally over their length when the tire is uninflated and under normal load as the shape of the sidewalls when the tire is under normal inflation pressure and load, said sidewall appendages being positioned on the sidewalls so as to be spaced from the support members when the tire is under normal load and inflation pressure.

11. The tire and rim according to claim 10, wherein each said sidewall appendage includes a radially inner surface generally coextensive with said annular support member and a generally radially extending axially outer surface, said rim including a generally radially extending containment member axially outwardly of said axially outer surface of said sidewall appendage for confinement of said sidewall appendage on the rim when the tire is uninflated and under load.

12. The tire and rim according to claim 10, wherein each shoulder has sufficient strength to constrain the respective sidewall between the respective shoulder and the rim, each sidewall having appropriate bending stiffness, curvature, and thickness so as to constrain it between the respective shoulder and the rim.

13. The tire and rim according to claim 10, wherein the axial width of the tread is at least 25 percent greater than the distaince axially of the tire between said rim flanges.

14. The tire and rim according to claim 10, wherein each annular support member includes a radially outer axially extending surface for engaging said respective sidewall appendages, each said sidewall appendage extending in a plane which includes the axis of rotation of the tire a distance along the respective sidewall which is at least equal to half of the distance in the plane along the exterior side of the sidewall from the axially outermost point of the respective shoulder to the point of intersection of the exterior surface of the respective sidewall with a line extending axially inwardly of the tire from the radially outer surface of the respective annular support member when the tire is mounted on the rim and placed under normal inflation pressure and unloaded.

15. A tire for use with a rim having an annular central portion, means including a pair of rim flanges for retaining the tire on the rim, and a pair of annular support members extending axially outwardly of the means for retaining the tire on the rim, the tire including a pair of bead portions for operative engagement with the means for retaining the tire on the rim, a ground-engaging tread having an axial width greater than the axial distance between the rim flanges, a pair of shoulders connected to the tread axially outwardly thereof, the improvement comprising: a pair of inclined sidewalls disposed between the shoulders and bead portions, said inclination of said sidewalls being such that in a cross-section of the tire taken in a radial plane, each said sidewall is disposed to lie axially inwardly of a line passing through the respective shoulder and bead portion; and a plurality of sidewall appendages on each of said inclined sidewalls and extending in an axial direction within the confines of the axial width of the tread and extending in a radial direction a distance such that when the tire is uninflated and under normal load, said sidewall appendages maintain the shape of said inclined sidewalls substantially the same as when the tire is under normal inflation pressure and load, said sidewall appendages being positioned on said sidewalls so as to be spaced from said annular support members when the tire is inflated and in supporting contact with said annular support members when the tire is uninflated and under load.

16. A tire for use with a rim having an annular central portion, means including a pair of rim flanges for retaining the tire on the rim, and a pair of annular support members extending axially outwardly of the means for retaining the tire on the rim, the tire including a pair of bead portions for operative engagement with the means for retaining the tire on the rim, a ground-engaging tread having an axial width greater than the axial distance between the rim flanges, a pair of shoulders connected to the tread axially outwardly thereof, the improvement comprising: a pair of sidewalls disposed between the shoulders and bead portions and having a curvature such as to discourage outward bulging of said sidewalls when the tire is in the uninflated condition and under load; and a plurality of sidewall appendages on each of said sidewalls extending in an axial direction within the confines of the axial width of said tread and extending in a radial direction a distance such that when the tire is uninflated and under normal load, said sidewall appendages maintain the shape of said sidewalls substantially the same as when the tire is under normal inflation pressure and load, said sidewall appendages being positioned on said sidewalls so as to be spaced from said annular support members when the tire is inflated and in supporting contact with said annular support members when the tire is uninflated and under load.

17. The tire according to claims 15 or 16 wherein the means for retaining the tire on the rim further includes a pair of annular bead seat surfaces on the annular central portion.

18. The tire according to claims 15 or 16 wherein each of the shoulders has sufficient strength to constrain each said respective sidewall between the respective shoulder and the rim, each of said sidewalls having appropriate bending stiffness, curvature, and thickness so as to constrain each of said sidewalls between the respective shoulder and the rim.

19. The tire according to claims 15 or 16, wherein said sidewall appendages comprise columns of elastomeric material spaced apart circumferentially about the tire and having sufficient strength under compression to support said sidewalls to maintain the tire while uninflated and under normal load in substantially the same shape as the shape of the tire under normal inflation pressure and load.

20. The tire according to claim 19, wherein the modulus of compression of said sidewall appendages is at least 25 pounds per square inch at 15 percent compression.

21. The tire according to claims 15 or 16, wherein said sidewall support means comprise support bodies of elastomeric material continuously joined over the annular periphery of said sidewalls and having sufficient strength under compression to support said sidewalls to maintain the tire while uninflated and under normal load in generally the same shape as the shape of the tire under normal inflation pressure and load, each said support body having a pair of legs, each of which merges into said respective sidewall and the adjacent leg of the adjacent support body.

22. In a tire and rim, an annular central portion and a pair of rim flanges on the rim, a pair of annular bead seat surfaces on the annular central portion, and an annular support member extending outwardly of each bead seat surface, a pair of bead portions on the tire for operative engagement with the bead seat surfaces for mounting of the tire on the rim, a ground-engaging tread having an axial width greater than the axial distance between the rim flanges, a pair of shoulders connected to the tread axially outwardly thereof, a pair of inclined sidewalls disposed between the shoulders and bead portions, said inclination of said sidewalls being such that in a cross-section of the tire taken in a radial plane, each said sidewall is disposed to lie axially inwardly of a line passing through the respective shoulder and bead portion, and a plurality of sidewall appendages on each of said inclined sidewalls and extending in an axial direction within the confines of the axial width of the tread and extending in a radial direction a distance such that when the tire is uninflated and under normal load, said sidewall support means maintain the shape of said inclined sidewalls substantially the same as when the tire is under normal inflation pressure and load, said sidewall appendates being positioned on said sidewalls so as to be spaced from said annular support members when the tire is inflated and in supporting contact with said annular support members when the tire is uninflated and under load.

23. In a tire and rim, an annular central portion and a pair of rim flanges on the rim, a pair of annular bead seat surfaces on the annular central portion, and an annular support member extending axially outwardly of each bead seat surface, a pair of bead portions on the tire for operative engagement with the bead seat surfaces for mounting of the tire on the rim, a ground-engaging tread having an axial width greater than the axial distance betweeen the rim flanges, a pair of shoulders connected to the tread axially outwardly thereof, a pair of sidewalls disposed between the shoulders and bead portions and having a curvature such as to discourage outward bulging of said sidewalls when the tire is in the uninflated condition and under load, and a plurality of sidewall appendages on each of said sidewalls extending in an axial direction within the confines of the axial width of said tread and extending in a radial direction a distance such that when the tire is uninflated and under normal load, said sidewall appendages maintain the shape of said sidewalls substantially the same as when the tire is under normal inflation pressure and load, said sidewall appendages being positioned on said sidewalls so as to be spaced from said annular support members when the tire is inflated and in supporting contact with said annular support members when the tire is uninflated and under load.

24. The tire according to claims 22 or 23, wherein each said sidewall appendage includes a radially inner surface generally coextensive with said annular support member and a generally radially extending axially outer surface, said rim including a generally radially extending containment member axially outwardly of said axially outer surface of said sidewall appendage for confinement of said sidewall appendage on said rim when the tire is uninflated and under load.

25. In a tire and rim, an annular central portion and a pair of rim flanges on the rim, a pair of annular bead seat surfaces on the annular central portion, an annular support member extending axially outwardly of each bead seat surface, a pair of bead portions on the tire for operative engagement with the bead seat surfaces for mounting the tire on the rim, a ground-engaging tread having an axial width greater than the axial distance between the rim flanges, a pair of shoulders connected to the tread axially outwardly thereof, a pair of sidewalls disposed between the shoulders and bead portions, a plurality of sidewall appendages on each of said sidewalls extending along said sidewalls a distance such that when the tire is uninflated and under normal load, said sidewall appendages maintain the shape of said sidewalls in substantially the same shape as when the tire is under normal inflation pressure and load, each said sidewall appendage including a radially inner surface juxtaposed with said annular support member and a generally radially extending axially outer surface, said rim including a generally radially extending containment member axially outwardly of said axially outer surface of said sidewall appendage for confinement of said sidewall appendage on said rim, said radially inner surface of said sidewall appendage spaced from said annular support member when the tire is inflated and in supporting contact with said annular support member when the tire is uninflated and under load.

* * * * *